3,060,112
Patented Oct. 23, 1962

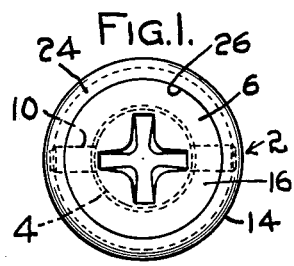
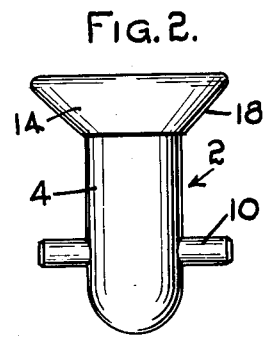
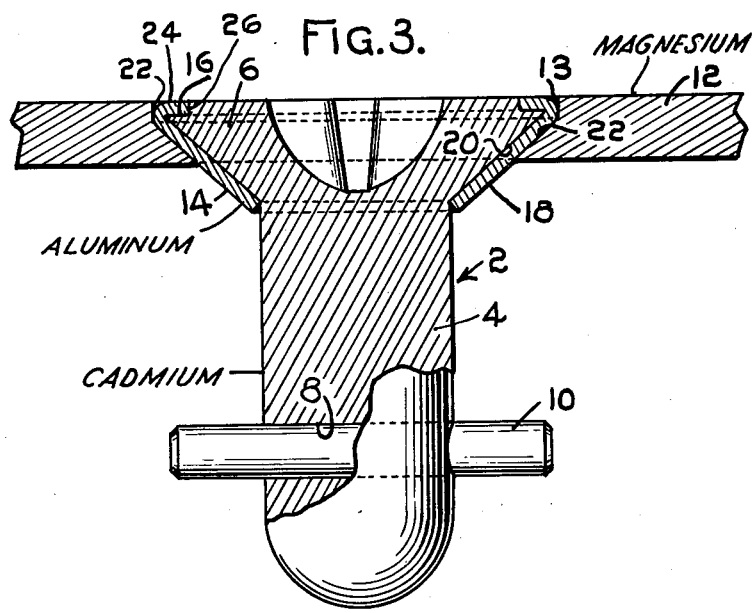

3,060,112
ALUMINUM GROMMETED STUD
Kerian J. Shomber, Torrance, Calif., assignor to United-Carr Fastener Corporation, Cambridge, Mass., a corporation of Delaware
Filed Dec. 22, 1958, Ser. No. 781,960
2 Claims. (Cl. 204—197)

This invention relates to an aluminum grommeted stud or screw. In many applications where it is necessary to have dissimilar metals in contact, a galvanic couple is set up between the two metals and there is a pronounced tendency for one of the metals to go into solution when the two of them are brought in contact with an aqueous solution. This galvanic action is considerably speeded up when the solution is saline in character. Many fabricated parts are made of magnesium and its alloys and a cadmium plated screw or stud which is used to fasten the magnesium to a frame such as is found in airplane manufacture. Magnesium is normally strongly electronegative (that is anodic) and has a pronounced tendency to go into solution when in contact with a metal such as cadmium in the presence of an electrolyte such as a saline solution. In the case of a galvanic couple consisting of cadmium and magnesium, the use of an aluminum washer between the two elements will prevent the mentioned galvanic action. Also it has been found that the use of any non-conductive washer will perform the same function. If cadmium and magnesium are in contact in a solution of salt water, the magnesium will corrode in a very short time, destroying the effectiveness of the attaching strength of the cadmium plated screw or stud. However, it has been discovered that an aluminum washer, although it prevented galvanic action, would be bridged over by the salt water and the couple would then be set up again between the cadmium plate and magnesium with the same unfortunate result mentioned heretofore. Applicant has devised a method whereby an aluminum grommet is substituted for the washer in a way to be explained hereinafter to prevent the bridging action, furthermore, applicant has assembled the aluminum or non-conductive grommet with the stud. Where the stud and grommet were not integral it was often found to be difficult to line these two elements up properly in an aperture in a magnesium support so that galvanic action could be prevented. Applicant's grommeted stud avoids this difficulty.

In the drawing:
FIG. 1 is a top plan view of the aluminum grommet that is applied to a cadmium plated "air locking stud";
FIG. 2 is a side elevation of the stud and the grommet shown in FIG. 1; and
FIG. 3 is an enlarged front elevation, partly in section of the stud and the grommet shown in FIG. 1, applied to an apertured plate.

The figures of the drawings illustrate a cadmium plated stud 2 comprising a shaft 4 and a head 6. In the particular embodiment illustrated the stud 2 is of the type known as an air lock. This particular stud has an aperture 8 formed in the shaft 4, a pin 10 is driven through the aperture 8 to form the locking feature as shown in FIGS. 2 and 3. Of course, the air lock stud is old in the art and the applicant doesn't intend that the patentable features of his invention be applied only to this form of stud. The stud 2 could be any type of fastener such as a screw, a combination of nut and bolt or some other similar type which could be used with the grommet. As applicant has stated in his introduction, the problem applicant faced is that of placing the stud 2 with its head 6 holding an apertured support 12 to a frame. In applicant's specific embodiment the support 12 is formed of magnesium. However the only basic requirement for the support 12 would be that it is made of some form of metal that is above hydrogen in the electromotive series, that is a moderately chemically active metal. In the preferred embodiment of applicant's invention the head 6 of the stud 2 is conical in shape as best illustrated in FIG. 2. To place the grommet 14 on the head 6 a piece of metal is formed to superimpose on the top of a portion of the flat surface 16 of the head 6. The length of the leg 18 is predetermined so that when it is forced against the converging edges 20 of the head 6 it will form an envelope around the head and will prevent the walls 22 of the aperture 8 from coming in contact with the head 6. Applicant has formed the grommet 14 of aluminum since his specific application called for a separation of the cadmium plated stud 2 and the magnesium support 12. However, any non-conductive material, for example, most plastics, would have served just as well. Applicant did not use plastic in this particular application because the magnesium sheets were used in airplane construction and most plastics will not stand the low temperatures found in high altitude flying. The grommet of applicant's invention is applied to the stud so that the two mentioned elements form one integral piece. The stud with its grommet is then engaged with the walls 22 of the support 12 and the locking means such as the pin 10 are engaged in place to lock the grommet 14 and the stud head 6 firmly against the walls 22 of the aperture formed in the support 12. The length of the top leg 24 of the grommet 14 is constructed so that it is the greatest possible distance between the point at which the grommet contacts the support and the terminal end 26 of the top leg 24.

Since certain other obvious modifications may be made in this device without departing from the scope of the invention, it is intended that all matters contained herein be interpreted in an illustrative and not in a limiting sense.

I claim:
1. The combination of a fastener stud of the class described and a metal barrier member, said fastener stud having a coating of a relatively inactive metal of the electromotive series and having a shank for passage into an aperture into a support, a slotted head at one end of said shank, said head having a support engaging surface and an outer surface, said metal barrier member formed of an intermediate metal of the electromotive series assembled to said fastener stud and covering said support engaging surface, said outer surface partially covered by said barrier member and the remaining portion of said outer surface exposed to the air, said support formed of an active metal of the electromotive series whereby said barrier member prevents galvanic coupling of said support and said fastener stud.

2. A combination of a fastener stud, a metal barrier member and an apertured support, said fastener stud having a coating of a relatively inactive metal of the electromotive series and having a shank and a frustum conical head portion integral with one end of said shank, said head having a support engaging surface in angular relationship to said shank and said head portion having an outer surface remote from said shank and in angular relationship to said support engaging surface, said support having an inner wall defining an aperture, said inner wall chamfered to form a countersink whereby engagement of said metal barrier member and said fastener stud with said inner wall places the said outer surface of said head on substantially the same plane as the upper surface of said support and said metal barrier member formed of an intermediate metal of the electromotive series assembled to said fastener stud and covering the support engaging surface of said head portion and said outer surface of said head portion partially covered by said barrier member with the remaining portion of said outer surface exposed to the medium surrounding said assembly, said support formed of a relatively active metal of the electromotive series whereby said barrier member prevents galvanic coupling of said support and said fastener stud.

References Cited in the file of this patent

UNITED STATES PATENTS

| | | |
|---|---|---|
| 242,595 | Brownell | June 7, 1881 |
| 2,326,455 | Gray | Aug. 10, 1943 |

OTHER REFERENCES

Ser. No. 383,003, Hilpert (A.P.C.), published May 18, 1943.